(12) United States Patent
Yoon et al.

(10) Patent No.: US 10,424,946 B2
(45) Date of Patent: Sep. 24, 2019

(54) APPARATUS AND METHOD FOR MANAGING BATTERY SYSTEM

(71) Applicant: LG CHEM, LTD., Seoul (KR)

(72) Inventors: Sung-Yul Yoon, Daejeon (KR); Young-Bo Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 216 days.

(21) Appl. No.: 15/623,564

(22) Filed: Jun. 15, 2017

(65) Prior Publication Data

US 2017/0366021 A1 Dec. 21, 2017

(30) Foreign Application Priority Data

Jun. 16, 2016 (KR) ........................ 10-2016-0075281

(51) Int. Cl.
*H01M 10/44* (2006.01)
*H01M 10/46* (2006.01)
*H02J 7/00* (2006.01)

(52) U.S. Cl.
CPC .......... *H02J 7/0021* (2013.01); *H02J 7/0003* (2013.01); *H02J 7/0013* (2013.01)

(58) Field of Classification Search
CPC ...... H02J 7/1423; H02J 7/0013; H02J 7/0018; H02J 7/0019; H02J 2007/0059
USPC ........ 320/103, 106, 110, 114, 139, 140, 141
See application file for complete search history.

(56) References Cited

U.S. PATENT DOCUMENTS

| | | |
|---|---|---|
| 6,037,756 A | 3/2000 | Pong |
| 2010/0096918 A1 | 4/2010 | Sawada et al. |
| 2013/0020997 A1 | 1/2013 | Iwasawa et al. |
| 2013/0224529 A1 | 8/2013 | Lee et al. |
| 2013/0300346 A1 | 11/2013 | Ishibashi |
| 2014/0009105 A1* | 1/2014 | Keates ................ H01M 10/425 320/103 |
| 2015/0019149 A1 | 1/2015 | Li et al. |
| 2015/0214754 A1 | 7/2015 | Choi et al. |
| 2015/0298568 A1 | 10/2015 | Mitsutani |
| 2015/0333543 A1* | 11/2015 | Hempel ............. H01M 10/441 320/129 |

(Continued)

FOREIGN PATENT DOCUMENTS

| | | | |
|---|---|---|---|
| EP | 2 469 682 A1 | 6/2012 | |
| EP | 2 538 518 A1 | 12/2012 | |

(Continued)

*Primary Examiner* — Edward Tso
(74) *Attorney, Agent, or Firm* — Birch, Stewart, Kolasch & Birch, LLP (57) ABSTRACT

Disclosed is an apparatus for efficiently managing a battery system in a situation where a charge or discharge power varies with time. The apparatus for managing a battery system includes a power measuring unit configured to measure the magnitude of a charge power supplied to a battery system or a discharge power output from the battery system, a reference setting unit configured to variably set a power distribution reference according to the measured magnitude of power, and a power distributing unit configured to distribute and supply a charge power to battery units having different outputs and capacities according to the set power distribution reference or allow a discharge power to be distributed and output from battery units having different outputs and capacities according to the set power distribution reference.

11 Claims, 3 Drawing Sheets

(56) References Cited

U.S. PATENT DOCUMENTS

2016/0052505 A1    2/2016  Zhou

FOREIGN PATENT DOCUMENTS

| | | |
|---|---|---|
| JP | 5461482 B2 | 4/2014 |
| JP | 2015-142507 A | 8/2015 |
| JP | 5884414 B2 | 3/2016 |
| KR | 10-1025896 B1 | 3/2011 |
| KR | 10-1178152 B1 | 8/2012 |
| KR | 10-1253715 B1 | 4/2013 |
| KR | 10-1332320 B1 | 11/2013 |
| WO | WO 03/088405 A2 | 10/2003 |

\* cited by examiner

FIG. 4

APPARATUS AND METHOD FOR MANAGING BATTERY SYSTEM

TECHNICAL FIELD

The present application claims priority to Korean Patent Application No. 10-2016-0075281 filed on Jun. 16, 2016 in the Republic of Korea, the disclosures of which are incorporated herein by reference.

The present disclosure relates to a technique for managing a battery system, and more particularly, to an apparatus and method for effectively managing a battery system in a circumstance where charge or discharge power is seriously changed, and applications using the apparatus.

BACKGROUND ART

In modern society, batteries are widely used in portable electronic products such as notebooks, computers, cameras, cellular phones and MP3 players, and various devices such as automobiles, robots, and satellites. Batteries may be classified into primary batteries and secondary batteries, and the secondary batteries are widely used because they have great advantages in terms of energy storage as well as repeated charging and discharging.

Secondary batteries commercially available at the present include nickel-cadmium batteries, nickel-hydrogen batteries, nickel-zinc batteries, lithium secondary batteries and the like. Among them, lithium secondary batteries are attracting attention due to very low self-discharging rate, high energy density, and free charging and discharging, caused by substantially no memory effect, in comparison to nickel-based secondary batteries.

In the secondary battery, a single battery cell may be used alone, but two or more battery cells may be electrically connected to each other in a single battery system so as to output or store higher power. In particular, as carbon energy is getting depleted and environmental concern is increasing recently, a battery system using a secondary battery is increasingly used in large-sized equipment. Since the battery system used in the large-sized equipment requires high output or high capacity, a large number of battery cells may be used in an electrically connected state.

A smart grid system is an example where a large battery system including a plurality of battery cells electrically connected as described above is used.

The smart grid system is an intelligent power network system for enhancing the efficiency of power utilization through the interaction of power supply and consumption by integrating the information and communication technology into power production, transportation and consumption processes. The amount of power consumed by a consumer is not always constant and may vary from time to time. Representatively, in the afternoon of summer, the amount of used power may abruptly increases due to the use of an air conditioner, and at night, the amount of used power decreases rapidly. In this way, the power consumption may not be consistent but frequently fluctuate in terms of a power consumer, but it is practically difficult for a power supplier to meet the changing amount of power consumption even though the power generation amount is controlled to some extent. Thus, power supply overload or power supply shortage may occur due to the unbalance of power supply and consumption. In order to solve this problem, the smart grid system checks a power usage state in real time and flexibly adjusts the power supply amount. One of important components for the smart grid system is a battery system for power storage. In the battery system for power storage, a much larger number of battery cells are electrically connected, in comparison to a battery system used for general electronic equipment or portable electronic products.

In addition, the power storage device in which many battery cells are electrically connected to each other may be used not only in the smart grid system but also in other fields such as a micro grid system or an electric vehicle charging station which supplies charge power to electric vehicles.

In the case of a battery used for the power storage device, the power consumption or the power supply is irregular, and thus the charge power or discharge power is not constant and frequently varies with time. In such a situation, if the configuration of an existing battery system or an existing battery management technology is applied to a power storage device or the like without any change, a power supply situation changing in real time may not be efficiently handled. In particular, if a specific battery cell is used excessively in comparison to other battery cells, the lifetime of the corresponding battery cell may be significantly reduced or have an increased risk of failure. Thus, in this case, the performance of the power storage device or the like may be degraded or the possibility of failure may increase. Therefore, in a battery system including a plurality of battery cells, it is very important how to use each battery cell.

DISCLOSURE

Technical Problem

The present disclosure is designed to solve the problems of the related art, and therefore the present disclosure is directed to providing an apparatus and method for managing a battery system, which may allow effective operation of the battery system in a situation where the power amount varies with time.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an apparatus for managing a battery system, comprising: a power measuring unit configured to measure the magnitude of a charge power supplied to a battery system or a discharge power output from the battery system; a reference setting unit configured to variably set a power distribution reference according to the measured magnitude of power; and a power distributing unit configured to distribute and supply a charge power to battery units having different outputs and capacities according to the set power distribution reference or allow a discharge power to be distributed and output from battery units having different outputs and capacities according to the set power distribution reference.

Here, the battery system may include a high-output battery unit having a relatively high output and a relatively low capacity and a high-capacity battery unit having a relatively high capacity and a relatively low output.

In addition, the power distributing unit may distribute a charge or discharge power lower than the power distribution reference to the high-capacity battery unit and distributes a charge or discharge power higher than the power distribution reference to the high-output battery unit.

In addition, the reference setting unit may set the power distribution reference by using a frequency filter.

In addition, the reference setting unit may set the power distribution reference as a value lower than the measured power.

In addition, the reference setting unit may set the power distribution reference as a value equal to or lower than a predetermined proportion of a peak of the measured power.

In addition, the battery unit may be a secondary battery.

In another aspect of the present disclosure, there is also provided a battery system, comprising the apparatus for managing a battery system according to the present disclosure.

In another aspect of the present disclosure, there is also provided a power storage device, comprising the apparatus for managing a battery system according to the present disclosure.

In another aspect of the present disclosure, there is also provided a method for managing a battery system, comprising: measuring the magnitude of a charge power supplied to a battery system or a discharge power output from the battery system; variably setting a power distribution reference according to the measured magnitude of power; and distributing and supplying a charge power to battery units having different outputs and capacities according to the set power distribution reference or allowing a discharge power to be distributed and output from battery units having different outputs and capacities according to the set power distribution reference.

Advantageous Effects

According to an embodiment of the present disclosure, in a situation where charge or discharge power changes in real time, the changing charge/discharge situation may be adaptively handled by using different kinds of batteries having different outputs and capacities.

In particular, according to the present disclosure, charge/discharge power may be input or output according to the characteristics of each battery module or battery cell (secondary battery), thereby enabling efficient operation of the battery system.

Therefore, according to the present disclosure, it is possible to prevent the life of a specific battery unit from being relatively shortened, so that the performance of the battery system may be stably maintained and the maintenance cost of the battery system may be reduced.

In addition, according to an embodiment of the present disclosure, a high-capacity (high energy) battery unit which is relatively inexpensive and a high-cost high-output battery unit which is relatively expensive may be responsible for charge/discharge power divisionally, so it is possible to operate or construct the battery system inexpensively and effectively.

Moreover, according to an embodiment of the present disclosure, a battery system management technique suitable for a frequency-adjusting power storage device may be provided

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
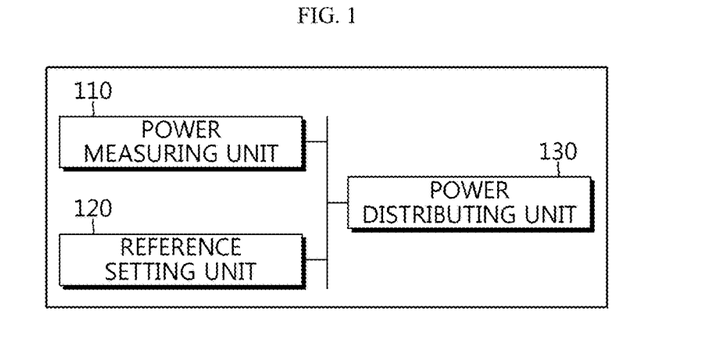
FIG. 1 is a block diagram schematically showing a functional configuration of an apparatus for managing a battery system according to an embodiment of the present disclosure.

FIG. 1 is a block diagram schematically showing a functional configuration of an apparatus for managing a battery system according to an embodiment of the present disclosure. Also, FIG. 2 is a schematic view showing an example where the apparatus for managing a battery system according to an embodiment of the present disclosure is applied in a battery system.

Figure 2:
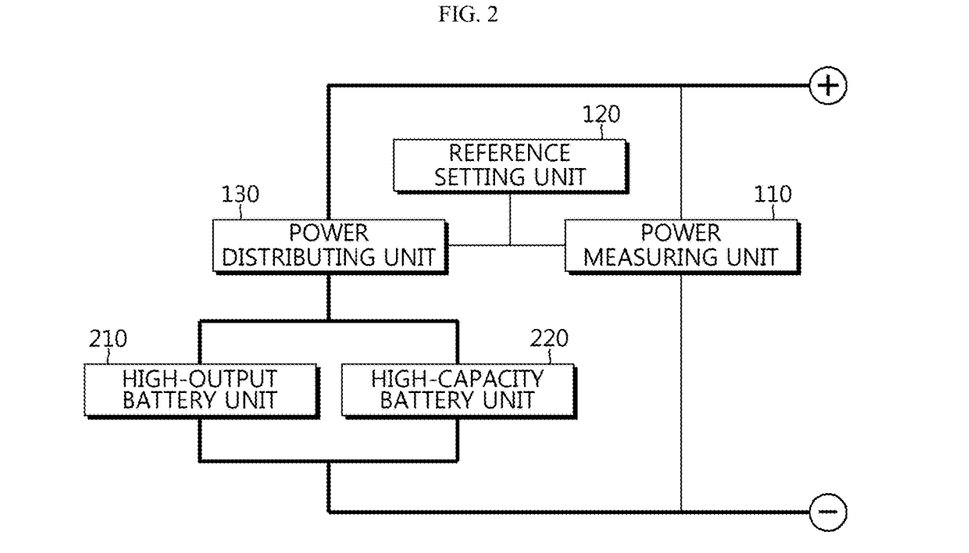
FIG. 2 is a schematic view showing an example where the apparatus for managing a battery system according to an embodiment of the present disclosure is applied in a battery system.

Referring to FIGS. 1 and 2, an apparatus for managing a battery system according to the present disclosure includes a power measuring unit 110, a reference setting unit 120, and a power distributing unit 130.

In particular, the apparatus for managing a battery system according to the present disclosure may be applied to a battery system including different kinds of battery units. Here, the different kinds of battery units may be regarded as meaning battery units having different capacities and outputs.

The power measuring unit 110 may measure the magnitude of a power with respect to a battery system. First, the power measuring unit 110 may measure the magnitude of a charge power supplied to the battery system. For example, the power measuring unit 110 may measure watts (W) of a power produced by a power plant and supplied to the battery system. Also, the power measuring unit 110 may measure the magnitude of a discharge power output from the battery system. Here, the magnitude of the discharge power output from the battery system may be the magnitude of a power actually supplied from the battery system to a load, or the magnitude of a power required for the battery system by the load and to be supplied by the battery system. For example, the power measuring unit 110 may measure the magnitude (watts) of the discharge power to be supplied from the battery system to the load side, for example a home or factory.

The reference setting unit 120 may set a power distribution reference. In particular, the reference setting unit 120 may variably set the power distribution reference according to the magnitude of the power measured by the power measuring unit 110.

In other words, the reference setting unit 120 may set the power distribution reference based on the power measured by the power measuring unit 110. At this time, when the measured power varies with time, the reference setting unit 120 may set the power distribution reference differently with time corresponding to the varying measured power.

Thus, according to this embodiment of the present disclosure, the power distribution reference may adaptively vary according to the magnitude of an actual charge or discharge power, thereby preventing any specific battery unit from being excessively used.

The power distributing unit 130 may allow the charge power or the discharge power to be distributed and allocated to different kinds of battery units. Here, the different kinds of battery units may be called battery units having different outputs and capacities.

The power distributing unit 130 may use the power distribution reference set by the reference setting unit 120 when distributing the power. In other words, the power distributing unit 130 may determine a power sharing ratio for different kinds of battery units according to the power distribution reference. For example, the power distributing unit 130 may control the charge power to be distributed and supplied to battery units having different outputs and capacities respectively according to the power distribution reference. Also, the power distributing unit 130 may control the discharge power to be distributed and output to battery units having different outputs and capacities respectively according to the power distribution reference. The power distributing unit 130 may include a power converter system (PCS).

In the battery system according to the present disclosure, the power distribution reference is set according to the magnitude of the charge/discharge power so that the charge/discharge power is divided between different kinds of battery units, and thus the kinds and used amounts of battery units may vary with time. Accordingly, the present invention may be more easily applied to a power storage device for frequency regulation that adjusts the frequency of electricity generated in a power plant, through a process of storing or supplying power in real time.

Preferably, the battery system may include a high-output battery unit 210 and a high-capacity battery unit 220. Here, the high-output battery unit 210 may be regarded as meaning a battery unit having a relatively high output and a relatively low capacity in comparison to other battery units. Also, the high-capacity battery unit 220 may be regarded as meaning a battery unit having a relatively high capacity and a relatively low output in comparison to other battery units.

In this way, in the battery system according to the present disclosure, the high-output battery unit 210 having a low capacity but a high output and the high-capacity battery unit 220 having a low output but a high capacity may be adaptably applied according to the magnitude of charge/discharge output. Therefore, it is possible to receive a charge power or output a discharge power, suitable for characteristics of each battery unit, and thus an optimum battery capacity may be designed. Further, for this reason, the life of each battery unit may be prolonged, and the performance may be stably maintained.

Here, the power distributing unit 130 may receive information on the charge power or discharge power measured by the power measuring unit 110 and the power distribution reference set by the reference setting unit 120 from the power measuring unit 110 and the reference setting unit 120. In addition, the power distributing unit 130 may compare the measured power with the power distribution reference so that the high-capacity battery unit 220 takes charge of the measured power lower than the power distribution reference and the high-output battery unit 210 takes charge of the measured power higher than the power distribution reference. At this time, the power distribution reference and the measurement values of the charge/discharge power may be compared based on their absolute values.

In other words, the power distributing unit 130 may control the battery system such that a charge or discharge power lower than the power distribution reference is distributed to the high-capacity battery unit 220. Also, the power distributing unit 130 may control the battery system such a charge or discharge power higher than the power distribution reference is distributed to the high-output battery unit 210.

For example, if the charge power of the battery system is measured as 0.6 MW in a state where the power distribution reference is set to 0.2 MW, the power distributing unit 130 may charge a charge power corresponding to 0 to 0.2 MW to the high-capacity battery unit 220 and charge a charge power corresponding to 0.2 to 0.6 MW to the high-output battery unit 210. In other words, for a charge power of 0.6 MW, a charge power of 0.2 MW may be distributed to the high-capacity battery unit 220, and a charge power of 0.4 MW may be distributed to the high-output battery unit 210.

As another example, if the power to be discharged by the battery system is measured as 0.4 MW in a state where the power distribution reference is set to 0.1 MW, the power distributing unit 130 may allow the high-capacity battery unit 220 to output a discharge power corresponding to 0 to 0.1 MW, namely a discharge power of 0.1 MW. In addition, the power distributing unit 130 may allow the high-output battery unit 210 to output a remaining discharge power corresponding to 0.1 to 0.4 MW, namely a discharge power of 0.3 MW.

As described above, the power distributing unit 130 may determine a distribution ratio of the charge/discharge power based on the power distribution reference. In other words, the power distributing unit 130 may determine charge/discharge power ratios to be shared by the high-output battery unit 210 and the high-capacity battery unit 220, respectively, by means of the power distribution reference.

Also preferably, the reference setting unit 120 may set the power distribution reference using a frequency filter.

For example, the reference setting unit 120 may obtain a filtered result value for the measured value of the charge power supplied to the battery system or the discharge power output from the battery system by getting the measured value through a filter. In addition, the reference setting unit 120 may use the filtered result value as it is, or set the power distribution reference through calculation.

Representatively, the reference setting unit 120 may be implemented using a low pass filter (LPF), a high pass filter (HPF), a band pass filter (BPF), or the like.

Figure 3:
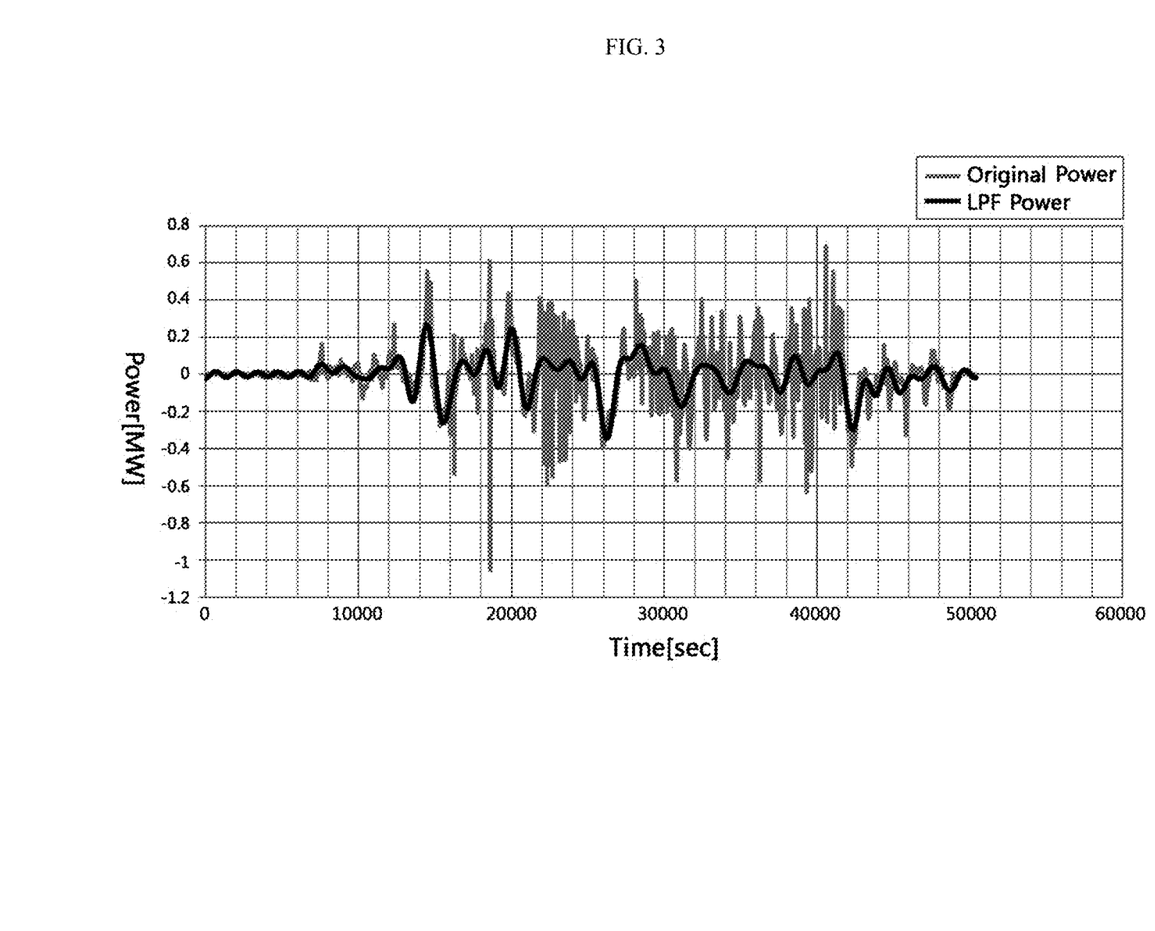
FIG. 3 is a graph showing an actual power value and a resultant power value filtered by a low pass filter, at the apparatus for managing a battery system according to an embodiment of the present disclosure.

FIG. 3 is a graph showing an actual power value and a resultant power value filtered by a low pass filter, at the apparatus for managing a battery system according to an embodiment of the present disclosure.

Referring to FIG. 3, an actual measurement value of the charge/discharge power may show a very sharp change rate over time. However, if the measured power is filtered by the low pass filter, a frequency exceeding a predetermined value is cut off, and thus the measured power may be changed into a form having a relatively gentle change rate, as indicated with a relatively darker graph. In addition, the power value filtered by the low pass filter in this way may be the power distribution reference set by the reference setting unit.

If the power distribution reference is set using the low pass filter as described above, the power distributing unit 130 may distribute the power to the high-output battery unit 210 and the high-capacity battery unit 220 by using this power distribution reference. In other words, the power distributing unit 130 may allow the high-output battery unit 210 to supply or receive a power for an output region where an actually measured power is higher than the power distribution reference and allow the high-capacity battery unit 220 to supply or receive a power for an output region where an actually measured power is lower than the power distribution reference.

Also preferably, the reference setting unit 120 may set the power distribution reference to a value lower than the measured power. In other words, the power distribution reference may be set to be always lower than the measured power.

For example, if the measurement power at a given time is 0.6 MW, the reference setting unit 120 may set the power distribution reference as a value lower than 0.4 MW, for example 0.2 MW. However, if the measurement power changes to 0.2 MW at a later point, the reference setting unit 120 may set the power distribution reference to a value lower than 0.2 MW, for example 0.05 MW.

If the power distribution reference is set to a value lower than an actual charge/discharge power, the charge/discharge power may be always shared by different battery units. In other words, regardless of an actual magnitude change of the charge/discharge power, the high-output battery unit 210 and the high-capacity battery unit 220 always output or receive the charge/discharge power dividedly, and thus it is possible to prevent that only any specific battery unit is excessively used.

Also preferably, the reference setting unit 120 may set the power distribution reference as a value equal to or lower than a predetermined proportion of a measured power peak. In other words, the power distribution reference may be set to be equal to or lower than a predetermined proportion of the measurement power peak.

In more detail, the reference setting unit 120 may set the power distribution reference not to exceed ⅓ of the measurement power peak. For example, if the measurement power at a given time is 0.6 MW, the power distribution reference may be set as a value that does not exceed 0.2 MW, which is ⅓ of 0.6 MW, for example 0.2 MW or 0.15 MW. In addition, if the measurement power is measured as 0.3 MW at a later point, the reference setting unit 120 may set the power distribution reference as a value not exceeding 0.1 MW, which is ⅓ of 0.3 MW, for example 0.1 MW or 0.05 MW.

According to this configuration of the present disclosure, the high-output battery unit 210 may be allowed to take charge of a relatively higher output than the high-capacity battery unit 220. Thus, in this case, the charge/discharge power may be input or output to meet the characteristics of the high-output battery unit 210 suitable for high output.

However, a setting ratio of the power distribution reference with respect to the measured power peak may be designed differently depending on types and characteristics of battery units, for example secondary batteries.

For example, the reference setting unit 120 may set the power distribution reference to be equal to or higher than 50% of the measurement power peak. In this case, the high-capacity battery unit 220 which is relatively more inexpensive and stable than the high-output battery unit 210 may be used more.

In particular, in the battery system according to the present disclosure, the battery unit may refer to a single secondary battery.

In other words, the battery system according to the present disclosure may include different kinds of secondary batteries having different outputs and capacities. In addition, the apparatus for managing a battery system may be configured to manage a battery system including such different kinds of secondary batteries. In particular, the battery system according to the present disclosure may include a high-output secondary battery with high output and low capacity and a high-capacity secondary battery with high capacity and low output.

The secondary battery may include a positive electrode plate coated with a positive electrode active material, a negative electrode plate coated with a negative electrode active material, a separator interposed between the positive electrode plate and the negative electrode plate, an electrolyte for allowing lithium ions or the like to move between the positive electrode plate and the negative electrode plate, and a case formed in the form of a battery can or a pouch case. At this time, the secondary battery may have different outputs and capacities depending on the compositions or amounts of the positive electrode active material, the negative electrode active material, the electrolyte or the like.

The battery system according to an embodiment of the present disclosure may include a high-output secondary battery and a high-capacity secondary battery together so that the battery system may be operated effectively even in a circumstance where the charge/discharge output varies in real time. Further, the high-output secondary battery may be relatively expensive compared to the high-capacity secondary battery. However, the battery system according to the present disclosure may not use the high-output secondary battery only, but the high-capacity secondary battery and the high-output secondary battery may be appropriately sharing power so that the battery system may be configured in an efficient and economical way.

In addition, in the battery system according to the present disclosure, the battery unit may refer to a battery module including a plurality of secondary batteries. In other words, the battery system according to the present disclosure may include a high-output battery module and a high-capacity battery module.

Here, the high-output battery module may be configured so that a plurality of high-output secondary batteries of the same kind are electrically connected to each other. Meanwhile, the high-capacity battery module may be configured so that as a plurality of high-capacity secondary batteries, which are of the same kind but different from secondary batteries used in the high-output battery module, are electrically connected.

According to this configuration of the present disclosure, since the battery module is configured using secondary batteries with similar characteristics, it would be easier to operate each battery module appropriately to meet the characteristics of the secondary batteries included therein. In addition, in this case, since the output and capacity characteristics of the battery modules may be varied due to the characteristics of the secondary batteries, it is not needed to configure an internal connection configuration differently, when implementing the high-output battery module and the high-capacity battery module.

Meanwhile, the high-output battery module and the high-capacity battery module include secondary batteries of the same kind but may be implemented with different electrical connection configurations. For example, the high-output battery module may include a relatively large number of serial connection configurations of secondary batteries, and the high-capacity battery module may include a relatively large number of parallel connection configurations of secondary batteries.

According to this configuration of the present disclosure, both the high-output battery module and the high-capacity battery module may be implemented using one type of secondary batteries.

Meanwhile, the reference setting unit 120 may set the power distribution reference such that the high-output battery unit 210 is used for less time than the high-capacity battery unit 220.

For example, the reference setting unit 120 may set the power distribution reference such that the high-output battery unit 210 is used equal to or less than a predetermined percentage of the total operating time of the battery system, for example equal to or less than 30% of the total operating time.

According to this configuration of the present disclosure, the maintenance cost of the battery system may be reduced to improve the economic efficiency by lowering the frequency of use of the high-output battery unit 210 (the high-output secondary battery), which is relatively expensive compared to the high-capacity battery unit 220 (the high-capacity secondary battery), in the battery system.

Also, the reference setting unit 120 may set the power distribution reference such that the high-output battery unit 210 uses less capacity than the high-capacity battery unit 220.

For example, the reference setting unit 120 may set the power distribution reference such that the high-output battery unit 210 is used with equal to or less than a predetermined percentage of the total operating power of the battery system, for example equal to or less than 20% of the total operating power.

In this case, the maintenance cost of the battery system may be reduced, and also the electric power may be input or output to meet the characteristics of the high-capacity battery unit 220, which is easy to store a large amount of electric power. Thus, in this case, the battery system may be efficiently operated.

The apparatus for managing a battery system as described above may be configured to be included in the battery system itself. In other words, the battery system according to the present disclosure may include the apparatus for managing a battery system according to the present disclosure along with a plurality of battery units. At this time, the plurality of battery units may include different types of battery units having different capacities and outputs. In addition, the battery unit used herein may mean either a single secondary battery or a battery module having a plurality of secondary batteries.

In particular, the apparatus for managing a battery system according to the present disclosure may be applied to a power storage device. Here, the power storage device is a device used for storing electric power and may represent a storage device used for various power storage facilities such as an energy storage system (ESS), a smart grid system, a micro grid system, a home electric power storage system, a car charging station and the like.

In particular, the power storage device may be applied to a smart grid system or the like. In this case, the production power of a power generation plant or the power consumption of a load may be greatly changed in real time. However, if the apparatus for managing a battery system according to the present disclosure is used, charge power or discharge power may be shared by different kinds of battery units appropriate for their characteristics, thereby enabling effective frequency adjustment.

Figure 4:
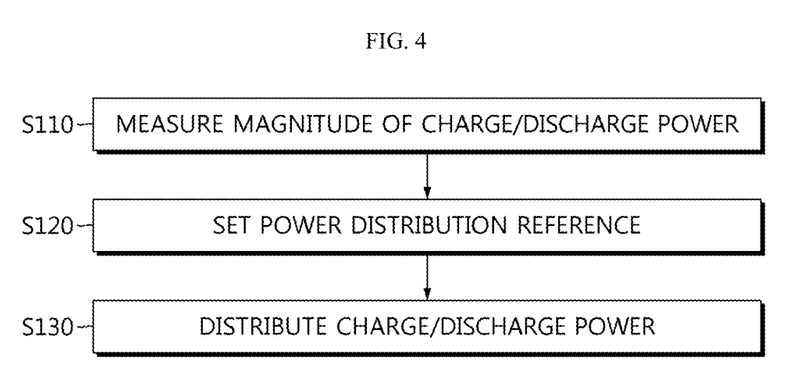
FIG. 4 is a schematic flowchart for illustrating a method for managing a battery system according to an embodiment of the present disclosure.

FIG. 4 is a schematic flowchart for illustrating a method for managing a battery system according to an embodiment of the present disclosure.

As shown in FIG. 4, according to a method for managing a battery system according to the present disclosure, magnitude of the charge power supplied to a battery system or the discharge power output from the battery system is measured (S110).

Next, a power distribution reference is variably set according to the magnitude of the power measured in Step S110 (S120).

After that, according to the power distribution reference set in Step S120, the charge power may be distributed and supplied to battery units having different outputs and capacities, or the discharge power may be distributed and output from battery units having different outputs and capacities (S130).

Meanwhile, in the specification, the term "unit" has been used, such as the 'power measuring unit', the 'reference setting unit' and the 'power distributing unit'. However, it would be obvious to those skilled in the art that this term 'unit' just represents a logic component unit and does not mean a component which can be always divided physically.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

110: power measuring unit
120: reference setting unit
130: power distributing unit
210: high-output battery unit
220: high-capacity battery unit

What is claimed is:

1. An apparatus for managing a battery system, comprising:
    a power measuring unit configured to measure a magnitude of a charge power supplied to a battery system or a discharge power output from the battery system;
    a reference setting unit configured to variably set a power distribution reference according to the measured magnitude of power using a frequency filter; and
    a power distributing unit configured to distribute and supply a charge power to battery units of the battery system having different outputs and capacities according to the set power distribution reference or allow a discharge power to be distributed and output from the battery units having different outputs and capacities according to the set power distribution reference, wherein the reference setting unit is further configured to obtain a filtered result value for the measured magnitude of the charge power using the frequency filter, and use the filtered result value to set the power distribution reference, so that when the measured power varies with time, the reference setting unit sets the power distribution reference differently with time.

2. The apparatus for managing a battery system according to claim 1,
wherein the battery units include a high-output battery unit having a relatively high output and a relatively low capacity and a high-capacity battery unit having a relatively high capacity and a relatively low output.

3. The apparatus for managing a battery system according to claim 2,
wherein the power distributing unit distributes a charge or discharge power lower than the power distribution reference to the high-capacity battery unit and distributes a charge or discharge power higher than the power distribution reference to the high-output battery unit.

4. The apparatus for managing a battery system according to claim 1,
wherein the reference setting unit sets the power distribution reference as a value lower than the measured power.

5. The apparatus for managing a battery system according to claim 1,
wherein the reference setting unit sets the power distribution reference as a value equal to or lower than a predetermined proportion of a peak of the measured power.

6. The apparatus for managing a battery system according to claim 1, wherein each battery unit is a secondary battery.

7. A battery system, comprising the apparatus for managing a battery system defined in claim 1.

8. A power storage device, comprising the apparatus for managing a battery system defined in claim 1.

9. The apparatus for managing a battery system according to claim 1, wherein the power distribution reference always dividedly outputs the charge power to all of the battery units or receives the discharge power from all of the battery units.

10. A method for managing a battery system, comprising:
measuring a magnitude of a charge power supplied to a battery system or a discharge power output from the battery system;
variably setting a power distribution reference according to the measured magnitude of power using a frequency filter; and
distributing and supplying a charge power to battery units of the battery system having different outputs and capacities according to the set power distribution reference or allowing a discharge power to be distributed and output from the battery units having different outputs and capacities according to the set power distribution reference,
wherein the reference setting unit obtains a filtered result value for the measured magnitude of the charge power using the frequency filter, and uses the filtered result value to set the power distribution reference, so that when the measured power varies with time, the reference setting unit sets the power distribution reference differently with time.

11. A method for managing a battery system according to claim 10, wherein the power distribution reference always dividedly outputs the charge power to all of the battery units or receives the discharge power from all of the battery units.

* * * * *